(12) United States Patent
Hanmura et al.

(10) Patent No.: US 6,596,378 B2
(45) Date of Patent: Jul. 22, 2003

(54) RECORDING MEDIUM AND AQUEOUS INK COMPOSITION

(75) Inventors: Masahiro Hanmura, Nagano (JP); Hiroyuki Onishi, Nagano (JP); Hiroko Hayashi, Nagano (JP); Miharu Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/861,902

(22) Filed: May 21, 2001

(65) Prior Publication Data

US 2002/0025412 A1 Feb. 28, 2002

(30) Foreign Application Priority Data

May 22, 2000 (JP) ........................................ 2000-149713

(51) Int. Cl.$^7$ .............................. B32B 27/14; B32B 3/00
(52) U.S. Cl. ...................... 428/195; 428/206; 428/331; 428/701; 548/257
(58) Field of Search ................................ 428/195, 206, 428/331, 701; 548/257

(56) References Cited

U.S. PATENT DOCUMENTS

| 5,614,008 A | 3/1997 | Escano et al. ............. 106/23 D |
| 5,858,514 A | 1/1999 | Bowers ....................... 428/195 |
| 6,436,513 B1 * | 8/2002 | Kitamura et al. ........... 428/195 |

FOREIGN PATENT DOCUMENTS

| EP | 0514633 | 11/1992 |
| EP | 0651037 | 5/1995 |
| EP | 0803554 | 10/1997 |
| EP | 0878522 | 11/1998 |
| EP | 0761783 | 10/1999 |
| EP | 0959112 | 11/1999 |
| EP | 0978547 | 2/2000 |
| JP | 091922 | 7/1997 |
| JP | 11302587 | 11/1999 |
| WO | 9830642 | 7/1998 |
| WO | 9948981 | 9/1999 |
| WO | 0022056 | 4/2000 |
| WO | 0023440 | 4/2000 |

OTHER PUBLICATIONS

English Abstract of WO 00/22056 Dated Apr. 20, 2000.
English Abstract of WO 00/23440 Dated Apr. 27, 2000.
English Abstract of WO 9948981 Dated Sep. 30, 1999.

* cited by examiner

Primary Examiner—Cynthia H. Kelly
Assistant Examiner—B. Shewareged
(74) Attorney, Agent, or Firm—Ladas & Parry

(57) ABSTRACT

A recording medium having an ink receiving layer comprising a porous pigment and a binder, wherein the ink receiving layer contains at least one benzotriazole compound represented by formula (I):

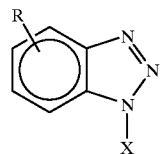

(I)

wherein R represents hydrogen atom or an alkyl group; X represents a hydrogen atom, a sodium atom, a potassium atom or a primary, secondary or tertiary amino group. Also disclosed is an aqueous ink composition containing a compound of formula (I) and an ink jet recording method using the recording medium or the aqueous ink composition.

5 Claims, No Drawings

RECORDING MEDIUM AND AQUEOUS INK COMPOSITION

FIELD OF THE INVENTION

This invention relates to a recording medium and an aqueous ink composition which each provide an image excellent in light fastness and gas fastness and preservable for an extended period of time and, more particularly, to a recording medium and an aqueous ink composition suitable to ink jet recording.

BACKGROUND OF THE INVENTION

With the recent innovative development in ink jet recording technology, the quality of images output on a recording medium ink jet recording has been increasing, easily standing comparison with silver salt photographic images. However, dyes, which are colorants used to form high-quality images on a recording medium, are susceptible to deterioration by light, such as ultraviolet light and visible light, and oxidizing gases, such as ozone, $NO_x$, $SO_x$, $H_2S$, etc. That is, they have poor light fastness and gas fastness. Therefore, the image recorded in ink comprising a dye as a colorant (hereinafter referred to as dye ink) exhibits, of necessity, poor fastness to light and gas and undergoes discoloration (color change and fading) with time even when kept from intense light, for example, when preserved indoors, still more when exposed to intense light. In other words, the image has poor indoor preservability and is inferior in this respect to silver salt photographs.

On the other hand, recording media for ink jet recording include a so-called swelling type which has an ink receiving layer mainly comprising a polymer, such as polyvinyl alcohol, and a so-called void type (also called absorbing type) which has an ink receiving layer mainly comprising fine porous particles of a pigment, such as amorphous silica, and a binder. Those two types differ in degree of deterioration of the dye caught in the ink receiving layer. When an image is recorded on a swelling type recording medium by ink jet recording using dye ink, the dye is buried in the polymer of the ink receiving layer so that it undergoes little discoloration due to air-mediated deterioration, for example, discoloration by air oxidation and air mediated photodeterioration (generation of single state oxygen and resultant decomposition of a dye). On the other hand, when a void type recording medium is recorded by ink jet recording in dye ink, the ink receiving layer, which has a vast number of pores, allows the dye to come into contact with air. It follows that the dye is susceptible to air-mediated deterioration and apt to undergo discoloration. Hence, the problem of air-mediated deterioration of dye is inherent to void type recording media.

It is known that preservability (indoor preservability) of an ink image formed on a recording medium can be improved by incorporating a benzotriazole ultraviolet (UV) absorber into the ink or the recording medium. However, a benzotriazole UV absorber should be added in a large quantity to manifest a sufficient effect. Besides, addition of a benzotriazole UV absorber to a recording medium tinges the recording medium with yellow and is therefore impractical.

JP-A-9-1922 proposes, incorporating a benzotriazole compound different from the above-described benzotriazole UV absorbers into an ink receiving layer. This method aims to present a solution to the problem, which is specific to a swelling type recording medium having an ink receiving layer containing gelatin as a main component, that the image is liable to get uneven in density to have reduced resolving power when allowed to stand open for a long time. There has been made no proposals as to a method for preventing air mediated dye deterioration which occurs specifically to a void type recording medium thereby to provide an image with improved preservability.

SUMMARY OF THE INVENTION

An object of the present invention is to provide a recording medium and an aqueous recording ink composition capable of providing an image which exhibits excellent fastness to light and gas and is prevented from air-mediated dye deterioration specific to a void type recording medium, particularly capable of providing an image which can be preserved indoors for an extended period of time without substantial discoloration.

Other objects and effects of the present invention will become apparent from the following description.

As a result of extensive investigation, the inventors of the present invention found that air-mediated dye deterioration inherent to a void type recording medium can be prevented to improve indoor image preservability (i.e., light fastness and gas fastness) by incorporating a benzotriazole compound having a specific structure into an ink receiving layer of a recording medium and/or a dye ink composition used for recording.

The present invention is based on this finding.

That is, the above described objects of the present invention have been achieved by providing the following recording media, aqueous ink compositions, and ink jet recording methods.

1) A recording medium having an ink receiving layer comprising a porous pigment and a binder, wherein said ink receiving layer contains at least one benzotriazole compound represented by formula (I):

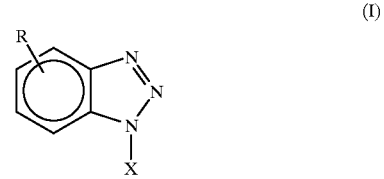

wherein R represents a hydrogen atom or an alkyl group; X represents a hydrogen atom, a sodium atom, a potassium atom or a primary, secondary or tertiary amino group.

2) The recording medium according to item 1) above, wherein said benzotriazole compound comprises at least one of benzotriazole, benzotriazole sodium salt, 4-methylbenzotriazole, 4-methylbenzotriazole sodium salt, and a benzotriazole amine salt.

3) The recording medium according to item 1) or 2) above, wherein said benzotriazole compound is present in a total amount of 0.01 to 5% by weight based on the weight of said ink receiving layer.

4) The recording medium according to any one of items 1) to 3) above, wherein said porous pigment is a silica pigment.

5) The recording medium according to any one of items 1) to 4) above, which is used for ink jet recording 6) An aqueous ink composition comprising a colorant, water, and 0.01 to 2% by weight of at least one benzotriazole compound represented by formula (I):

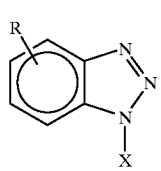

(I)

wherein R represents a hydrogen atom, or an alkyl group; X represents a hydrogen atom, a sodium atom, a potassium atom or a primary, secondary or tertiary amino group.

7) The aqueous ink composition according to item 6) above, wherein said benzotriazole compound comprises at least one of benzotriazole, benzotriazole sodium salt, 4-methylbenzotriazole, 4-methylbenzotriazole sodium salt, and a benzotriazole amine salt.

8) The aqueous ink composition according to item 6) or 7) above, wherein said colorant is a dye.

9) The aqueous ink composition according to item 8) above, wherein said dye is represented by formula (II):

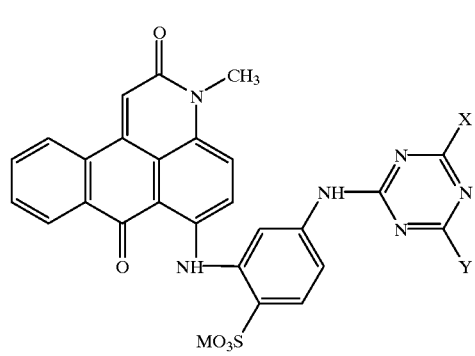

(II)

wherein X represents anilino group substituted by at least one SO$_3$M group, Y represents OH, Cl or a morpholino group, and M represents a member selected from H, Ti, Na, K, ammonium and organic amines.

10) The aqueous ink composition according to any one of items 6) to 9) above, which is used for ink jet recording.

11) The aqueous ink composition according to any one of items 6) to 10) above, which is used for forming an image on a recording medium having an ink receiving layer comprising a porous pigment and a binder.

12) An ink jet recording method comprising forming an image on a recording medium according to any one of items 1) to 5) above with an aqueous ink composition containing a dye represented by formula (II):

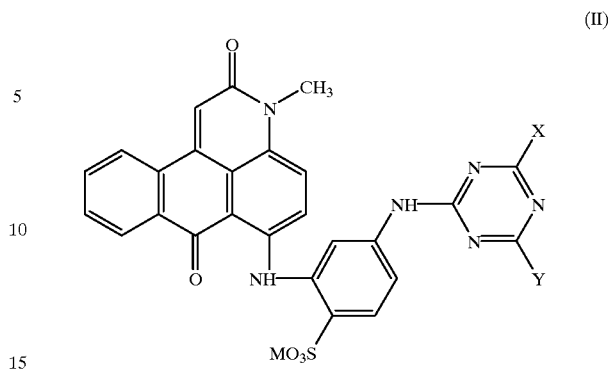

(II)

wherein X represents anilino group substituted by at least one SO$_3$M group, Y represents OH, Cl or a morpholino group, and M represents a member selected from H, Li, Na, K, ammonium and organic amines.

13) An ink jet recording method comprising ejecting a droplet of an aqueous ink composition according to any one of items 6) to 11) above to attach the ejected droplet onto a recording medium, thereby performing printing.

DETAILED DESCRIPTION OF THE INVENTION

The recording medium according to the present invention is classified into a void type in which the ink receiving layer comprises a porous pigment and a binder. The ink receiving layer further comprises a benzotriazole compound of formula (I).

In formula (I), R represents a hydrogen atom or an alkyl group. The alkyl group includes a substituted or unsubstituted menthol group and a substituted or unsubstituted ethyl group. R is preferably a hydrogen atom.

X represents a hydrogen atom, a sodium atom, a potassium atom or a primary, secondary or tertiary amino group. The primary amino group includes methylamino, ethylamino and propylamino. The secondary amino group includes dimethylamino, diethylamino, and N-methylethylamino. The tertiary amino group includes trimethylamino, triethylamino, N,N-dimethylethylamino, and N,N-diethylmethylamino. X is preferably a hydrogen atom.

Preferred examples of the benzotriazole compounds represented by formula (I) are benzotriazole, benzotriazole sodium salt, 4-methylbenzotriazole, 4-methylbenzotriazole sodium salt, and a benzotriazole amine salt. Benzotriazole is particularly preferred for its solubility. These benzotriazole compounds can be used either individually or as a combination of two or more thereof.

The amount of the benzotriazole compound of formula (I) in the ink receiving layer is preferably 0.01 to 5% by weight, still preferably 0.1 to 3% by weight. With a benzotriazole compound content less than 0.01% by weight, the improving effects on light fastness and gas fastness tend to be insubstantial, failing to sufficiently protect the colorant against air-mediated deterioration. When added in amounts exceeding 5% by weight, the benzotriazole compound tends to impair ink absorptivity of ink receiving layer.

The porous pigment which can be used in the ink receiving layer includes silica pigments (e.g., silica prepared by a precipitation method or a gas phase method and silica gel), smectite, calcium carbonate, calcium sulfate, barium sulfate, titanium dioxide, kaolin, white clay, talc, magnesium silicate, and calcium silicate. They can be used either individually or as a mixture thereof. Preferred of them are silica pigments for their high purity, competitive price and availability. Particularly preferred are silica by a precipitation method and silica gel.

It is preferred for the porous pigment to have a BET specific surface area of 100 to 500 $m^2/g$, particularly 200 to 400 $m^2/g$, from the standpoint of balance between image quality (e.g., color developability and resolving power) and image preservability. Where the BET specific surface area is less than 100 $m^2/g$, the image density tends to be reduced. If it is more than 500 $m^2/g$, there is a fear that the colorant cannot be sufficiently prevented from air-mediated deterioration, and the recorded image may have poor preservability.

The average particle size of the porous pigment is selected from the range generally usable as a pigment. From the viewpoint of smoothness of the ink receiving layer and for improvement on image quality such as resolving power, a preferred average particle size is 0.05 to 15 $\mu$m, particularly 0.1 to 10 $\mu$m.

The content of the porous pigment in the ink receiving layer preferably range from 40 to 90% by weight, particularly 50 to 80% by weight. With a porous pigment content less than 40% by weight, ink absorptivity may be insufficient. With a porous pigment content more than 90% by weight, the ink receiving layer tends to have reduced film strength.

The binder which can be used to make the ink receiving layer is not particularly limited and includes any substance capable of binding the porous pigment particles and increasing the film strength. Suitable binders include polyvinyl alcohol, silanol-modified polyvinyl alcohol, polyvinyl acetate, starch, cellulose derivatives (e.g., carboxymethyl cellulose), casein, gelatin, latices of conjugated diene copolymers (e.g., a styrene-butadiene copolymer), latices of vinyl copolymers (e.g., an ethylene-vinyl acetate copolymer), and latices of acrylic copolymers (e.g., copolymers of acrylic acid or methacrylic acid). These binders can be used either individually or as a mixture thereof. Of the above-recited binders particularly preferred is polyvinyl alcohol.

The binder is preferably used in a proportion of 5 to 60%, particularly 10 to 50% by weight, based on the porous pigment. With a binder proportion less than 5% by weight, the ink receiving layer tends to have reduced strength. In proportions exceeding 60% by weight, ink absorptivity or colorant absorptivity tends to be reduced.

If desired, the ink receiving layer can contain one or more additives, such as dye fixatives, fluorescent whitening agents, waterproofing agents, antifungal agents, preservatives, dispersants, surface active agents, thickeners, pH adjustors, defoaming agents, and humectants.

The dye fixatives include cationic organic substances, polyvalent metal ions, and cationic surface active agents.

The cationic organic substances include low molecular compounds, such as primary, secondary or tertiary amines, primary, secondary or tertiary amine salts, and quaternary ammonium salts; and oligomers or polymers having a primary, secondary or tertiary amino group, a primary, secondary or tertiary amine base, or a quaternary ammonium base. Specific examples are a diallyldimethylammonium chloride polymer, an epihalohydrin-secondary amine copolymer, a diallyldimethylammonium chloride-sulfur dioxide copolymer, a diallyldimethylammonium chloride-acrylamide copolymer, a diallymethylammonium salt polymer, a diallylamine hydrochloride-sulfur dioxide copolymer, a dimethylmethylamine hydrochloride copolymer, polyallylamine, polyethyleneimine, polyethyleneimine quaternary ammonium salt, a (meth) acrylamidoalkylammonium salt polymer, and ionene having a quaternary ammonium base. The polyvalent metal ions include $Al^{3+}$, $Ca^{2-}$, and $Mg^{12}$. The cationic surface active agents include benzalkonium chloride. These dye fixatives can used either individually or as a combination of two or more thereof. Polymers having a quaternary ammonium base are particularly preferred as a dye fixative.

The dye fixative is preferably used in an amount of 0.5 to 15% by weight, particularly 1 to 10% by weight, based on the ink receiving layer. Amounts less than 0.5% by weight are ineffective in improving color developability and water resistance of a recorded image. When added in amounts exceeding 15% by weight, the dye fixative tends to reduce ink absorptivity or induce the colorant to bleed to cause bronzing.

The substrate on which the ink receiving layer is provided includes paper (including sized paper), resin-coated (e.g., paper coated with polyethylene, polypropylene of polyester), photographically useful substrates such as baryta paper and so called RC paper, thermoplastic resin films of polyethylene terephthalate, polyethylene, polypropylene, etc., synthetic paper, and sheeting formed of synthetic fiber.

The substrate preferably has a basis weight of 50 to 120 $g/m^2$, particularly 70 to 100 $g/m^2$, and a thickness of 100 to 240 $\mu$m, particularly 140 to 200 $\mu$m.

The recording medium of the invention is typically produced by coating the substrate with an aqueous coating composition prepared from the benzotriazole compound of formula (I), the porous pigment, the binder, and necessary additives (e.g., dye fixatives) by any known coating technique, such as roll coating, blade coating, air knife coating, gate roll coating or size pressing, and drying the coating layer by a known means, such as a hot air drier or a far-infrared drier. In order to improve the surface strength and smoothness of the ink receiving layer, the coating layer thus provided can be calendered to an extent that does not impair the ink absorptivity.

The coating weight of the ink receiving layer is preferably 10 to 40 $g/m^2$, still preferably 20 to 30 $g/m^2$, on a solid basis. Where it is less than 10 $g/m^2$, the effect in improving color developability of dyes is insubstantial. A coating weight more than 40 $g/m^2$ is liable to cause dusting. The thickness of the ink receiving layer is preferably 10 to 40 $\mu$m, still preferably 20 to 30 $\mu$m.

The ink receiving layer preferably has a void of 30 to 80%. particularly 40 to 70%. The ink receiving layer which has a void less than 30% tends to be unsatisfactory in ink drying properties, absorption rate, absorption capacity, and the like. If the void is more than 80%, the porous pigment is apt to fall off to cause slippage of a paper feed roll or clogging of a recording head. The void of the ink receiving layer can be adjusted within the above range by calendering and the like. The void of the ink receiving layer is measured in accordance with J. TAPPI No. 40-85.

The recording medium of the invention can be recorded with any ink commonly used in ink jet recording or the like recording systems. Such ink is generally aqueous ink comprising a colorant, such as a dye or a pigment, and water. The colorant of the aqueous ink being prevented from air-mediated deterioration by the action of the benzotriazole compound of formula (I) in the ink receiving layer, the image formed on the recording medium of the invention with the aqueous ink is excellent in light fastness and gas fastness and can be stored indoors for a long period of time with little discoloration. In particular, an image formed on the recording medium of the invention with aqueous ink containing a magenta dye represented by formula (II) (hereinafter described) is particularly superior in light fastness. Being of void type, the recording medium of the invention exhibits excellent ink absorbing properties (quick drying properties) even where recording is carried out with an increased ink output.

The aqueous ink composition according to the present invention comprises at least a colorant, water, and 0.01 to 2% by weight, preferably 0.1 to 1% by weight, of at least one benzotriazole compound of formula (I). If the content or the benzotriazole compound is less than 0.01% by weight, no improving effects on light fastness and gas fastness is produced. If it is more than 2% by weight, the flying properties of ink droplets may change, and nozzles tend to be clogged.

The colorant which can be used in the aqueous ink composition includes dyes and pigments. Dyes are preferred to pigments for high color density developed per unit weight and brightness of colors. Water-soluble dyes are still preferred, such as acid dyes, direct dyes, mordant dyes, reactive dyes, solubilized vat dyes, solubilized sulfur dyes, food colors, etc. as classified in color index.

The effects of the present invention in providing an image excellent in gas fastness and light fastness are pronounced particularly where dyes having poor light fastness and gas fastness are used.

While the aqueous ink composition containing the benzotriazole compound of formula (I) provides a light-fast image by itself, a more light-fast image can be obtained where the aqueous ink composition contains a magenta dye represented by formula (II).

Examples or preferred dyes of formula (II) include dyes M-1 to M-10 shown below. They can be used either individually or as a combination thereof.

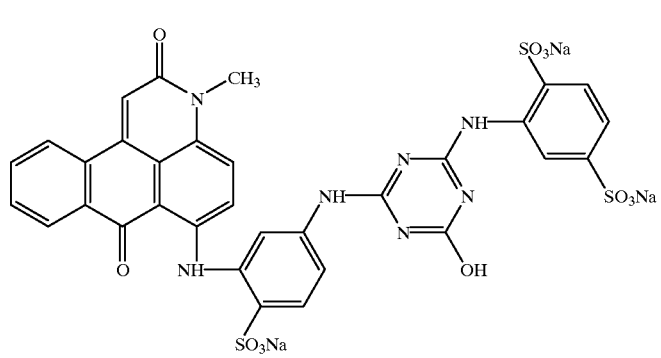

M-1

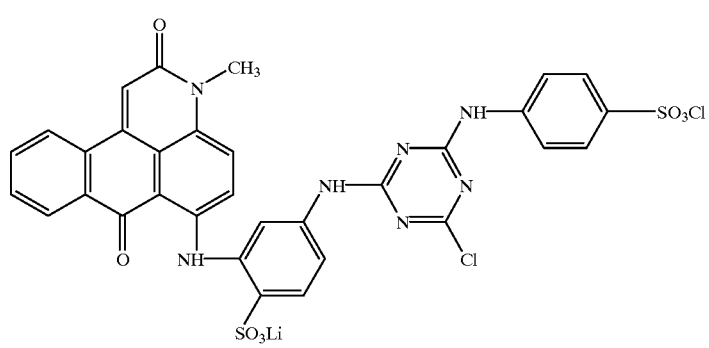

M-2

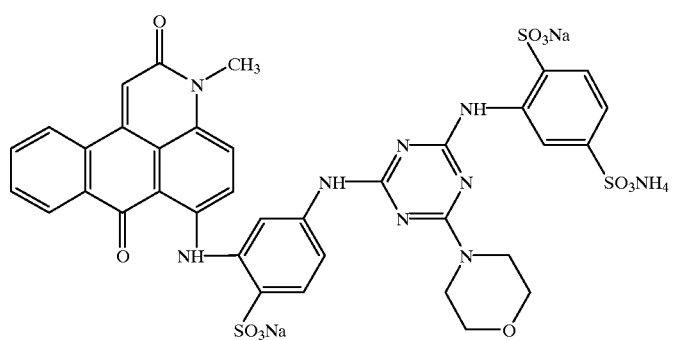

M-3

M-4
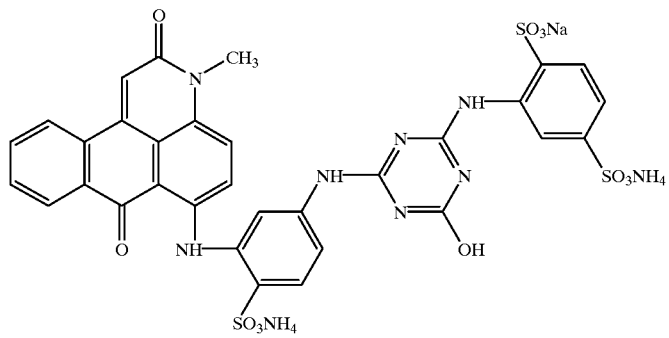
M-5
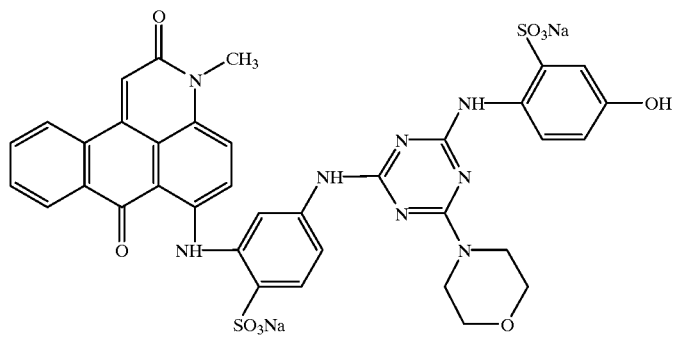
M-6
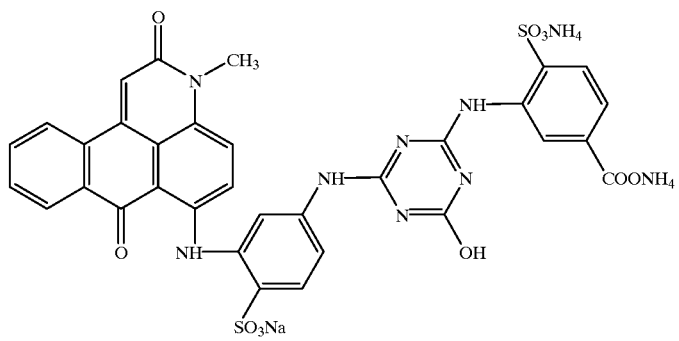
M-7
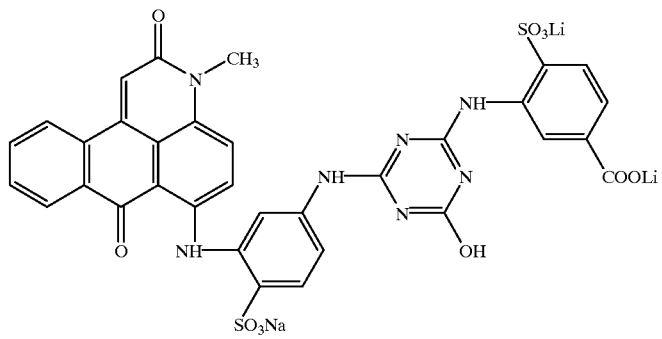

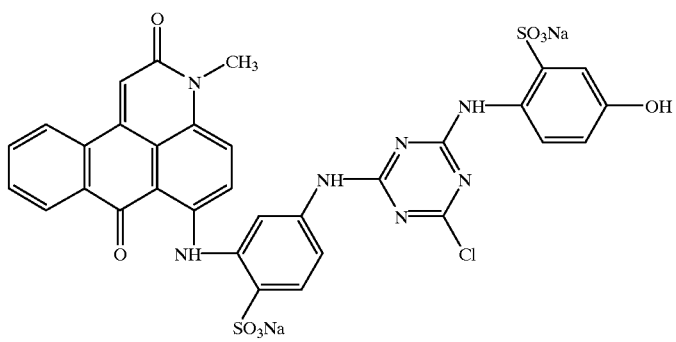

M-8

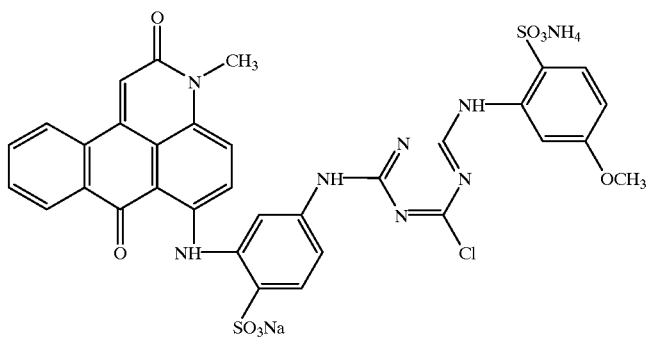

M-9

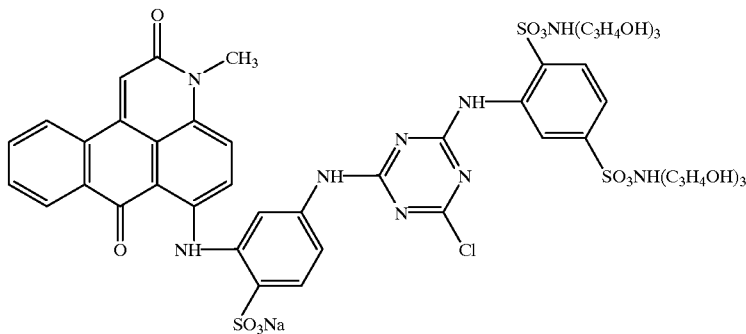

M-10

Water which is used as a main solvent of the aqueous ink composition includes pure water or ultrapure water, such as ion-exchanged water, ultrafiltered water, reverse osmotic water, and distilled water. Water sterilized by UV irradiation or addition of hydrogen peroxide is advantageous for, antifungal or antibacterial control.

If desired, the aqueous ink composition can contain one or more additives, such as penetrants, surface active agents, wetting agents, anti-clogging agents, preservatives or antifungals, pH adjustors, dissolution aids, antioxidants, surface tension modifiers, viscosity modifiers, dielectric constant modifiers, oxygen absorbers, and so forth.

Recording media suitable for recording with the aqueous ink composition of the invention are those of void type in which the ink receiving layer comprises a porous pigment and a binder. Images recorded on void type recording media with the aqueous ink composition of the invention exhibit excellent fastness to light and gas and withstand long-term preservation.

The recording medium and the aqueous ink composition according to the present invention are suited chiefly to ink jet recording. Any ink jet recording system in which ink droplets are ejected and fixed to a recording medium is applicable. Particularly suitable is drop-on-demand ink jet recording, which includes a piezoelectric system using a piezoelectric element disposed on a printer head and a thermal jet system utilizing heat energy of a resistance heating element disposed on a printer head. The recording medium and the aqueous ink composition of the invention manifest excellent effects in any of these recording methods.

Various changes and modifications can be made in the present invention without departing from the spirit thereof. For example, the ink receiving layer can be provided on either one or both sides of the substrate. The recording medium can be produced by coating a substrate with a coating composition comprising the above-described components except the benzotriazole compound and, after drying the coating layer, applying an aqueous solution of the benzotriazole compound to the coated layer by dipping, size pressing, spraying or a like method.

The aqueous ink composition of the invention is not particularly restricted, except that it contains a specific amount of the benzotriazole compound of formula (I), and formulations and ingredients generally employed in recording ink of this type can be used.

The present invention will now be illustrated in greater detail with reference to Examples, but the invention should

EXAMPLE 1

A coating composition having the following formulation was applied to a substrate (Lumirror 125T, available from Toray Ind., Inc.) to a dry coating weight of 20 g/m² by means of an air knife coater and dried in a hot air drier at 140° C. for 3 minutes to prepare a recording medium (designated recording medium 1).

Formulation of Coating Composition

| | |
|---|---|
| Silica (Fine Seal X37B, available from Tokuyama corp.) | 100 parts |
| Polyvinyl alcohol (10% aqueous solution; Gohsenal T-300, available from The Nippon Synthetic Chemical Ind. Co., Ltd.) | 400 parts |
| Cationic polymer (Neofix RP-70, available from Nikka Kagaku Kogyo K.K.) | 25 parts |
| Benzotriazole | 3 parts |
| Water | 600 parts |

EXAMPLE 2

A recording medium 2 was prepared in the same manner as in Example 1, except for replacing benzotriazole with 3 parts of 4-methylbenzotriazole.

EXAMPLE 3

Ink components shown below were mixed and filtered under pressure through a membrane filter having a pore size of 1 μm to prepare a set of color inks (cyan, magenta, and yellow, designated ink set 1.

Formulation of Cyan (C) Ink

| | |
|---|---|
| C.I. Direct Blue 199 | 3.0 parts |
| Benzotriazole | 1.0 part |
| Triethylene glycol monobutyl ether | 10 parts |
| Diethylene glycol | 10 parts |
| Glycerol | 10 parts |
| Triethanolamine | 1.0 part |
| Disodium ethylenediaminetetraacetate | 0.01 part |
| Olfin E1010 (acetylene glycol surface active agent available from Nisshin Chemical Ind. Co., Ltd.) | 1.0 part |
| Proxel XL-2 | 0.3 part |
| Ion-exchanged water | 65 parts |

Formulation of Magenta (M) Ink

| | |
|---|---|
| C.I. Acid Red 52 | 1.5 parts |
| C.I. Acid Red 240 | 1.5 parts |
| Benzotriazole | 1.0 part |
| Triethylene glycol monobutyl ether | 10 parts |
| Diethylene glycol | 10 parts |
| Glycerol | 10 parts |
| Triethanolamine | 1.0 part |
| Disodium ethylenediaminetetraacetate | 0.01 part |
| Olfin E1010 | 1.0 part |
| Proxel XL-2 | 0.3 part |
| Ion-exchanged water | 65 parts |

Formulation of Yellow (Y) Ink

| | |
|---|---|
| C.I. Acid Yellow 32 | 2.0 parts |
| Benzotrizole | 1.0 part |
| Triethylene glycol monobutyl ether | 10 parts |
| Diethylene glycol | 10 parts |
| Glycerol | 10 parts |
| Triethanolamine | 1.0 part |
| Disodium ethylenediaminetetraacetate | 0.01 part |
| Olfin E1010 | 1.0 part |
| Proxel XL-2 | 0.3 part |
| Ion-exchanged water | 65 parts |

EXAMPLE 4

A set of C, M and Y color inks (designated ink set 2) were prepared in the same manner as in Example 3, except for using 4 methylbenzotriazole in place of benzotriazole in the same concentration.

EXAMPLE 5

A set of C, M and Y inks (designated ink set 3) were prepared in the same manner as in Example 3, except that the M ink had the following formulation.

Formulation of Magenta Ink (M)

| | |
|---|---|
| Dye M-1 | 4 parts |
| Benzotriazole | 1 part |
| Triethylene glycol monobutyl ether | 10 parts |
| Diethylene glycol | 10 parts |
| Glycerol | 10 parts |
| Triethanolamine | 1 part |
| Disodium ethylenediaminetetraacetate | 0.01 part |
| Olfin E1010 | 1 part |
| Proxel XL-2 | 0.3 part |
| Ion-exchanged water | 65 parts |

Comparative Example 1

A recording medium (designated recording medium 3) was prepared in the same manner as in Example 1, except that benzotriazole was not used in the coating composition.

Ink set 4 was prepared in the same manner as in Example 3, except that benzotriazole was not used.

Comparative Example 2

Ink set 5 was prepared in the same manner as in Example 5, except that benzotriazole was not used.

Comparative Example 3

Recording medium 4 was prepared in the same manner as in Example 1, except for using a coating composition having the following formulation.

Formulation of Coating Composition

| | |
|---|---|
| Silica (Fine Seal X37D) | 100 parts |
| Polyvinyl alcohol (10% aqueous solution; Gohsenal T-330), | 400 parts |
| Cationic polymer (Neofix RP-70) | 25 parts |
| Benzotriazole UV absorber (solid content; 30%; AdekaStab LX-301 available from Asahi Denka Kogyo K.K. | 10 parts |
| Water | 600 parts |

Comparative Example 4

Recording medium 5 was prepared in the same manner as in Example 1, except that a coating composition having the following formulation was applied to a dry coating weight of 10 g/m².

Formulation of Coating Composition

| | |
|---|---|
| Lime-processed gelatin | 70 parts |
| Polyvinylpyrrolidone (PVP-90, available from BASF) | 70 parts |
| Cationic polymer (Neofix RP-70) | 25 parts |
| Benzotriazole | 3 parts |
| Surface active agent (Megafax F-120, available from Dainippon Ink & Chemicals Inc.) | 1 part |
| Water | 1800 parts |

Evaluation of Light Fastness, Indoor Preservability, Ozone Fastness, and Ink Absorptivity Recording media 1 to 5 were printed solid in each of C, M, Y, and a composite black (Bk) according to the combination shown in Table 1 below on an ink jet printer MJ-030C supplied by Seiko Epson Corp. The monochromatic solid images were evaluated according to the following methods. The results obtained are shown in Table 1 below. The printing method was arranged so that the composite black is composed of three aqueous recording inks of C, M and Y.

1) Light Fastness

The C, M or Y image was subjected to 50-hour accelerated exposure testing in a Ci35A Weatherometer from Atlas Electric Device Co. under conditions of a temperature of 40° C., a relative humidity of 50%, a black panel temperature of 63° C., and an irradiance of 0.25 W/m² measured at 340 nm. Color fading was expressed as a retention (%) of optical density (ROD) as measured with a Gretag densitometer. A greater ROD indicates higher light fastness.

ROD (%)=(D/D$_1$)×100

D: OJ after exposure; D$_1$: OD before exposure

2) Indoor Preservability

The image printed in Bk was left to stand as stuck on the wall of a room kept at 24° C. and 60% RH for 1 month, and a color difference (ΔE'ab) of the Bk image from the color immediately after printing was obtained according to JIS Z8730. A smaller ΔE'*ab indicates higher indoor preservability.

3) Ozone Fastness

The image printed in Bk was left to stand in a light-shielded container having an ozone concentration of 10 ppm at 24° C. and 60% RH for 120 minutes. A color difference (Δ*Eab) of the Bk image from the color before ozone treatment was obtained according to JIS Z8730. A smaller Δ*Eab means higher ozone fastness.

4) Ink Absorptivity

Monochromatic C, M and Y images were printed on the ink jet printer MJ-030C on recording media 1 to 5 according to the combination shown in Table 1 to give a reflective density of 2.0 or more in each color. Immediately after printing, paper for a plain paper copier was superposed on the printed area and pressed lightly. The amount of the ink transferred to the paper was observed with the naked eye and rated as follows. Standard for rating:

A . . . No transfer

B . . . Slight transfer

C . . . Considerable transfer

TABLE 1

| Combination No. | Recording Medium | Ink Set | Light Fastness (ROD; %) | | | Indoor Preservability' (ΔE'ab) | Ozone Fastness' (ΔE'ab) | Ink Absorptivity | Remark |
|---|---|---|---|---|---|---|---|---|---|
| | | | Y | M | C | | | | |
| 1 | 1 | 4 | 80 | 75 | 98 | 1.2 | 8.0 | A | Invention |
| 2 | 2 | 4 | 78 | 74 | 97 | 1.3 | 6.2 | A | " |
| 3 | 3 | 1 | 82 | 76 | 97 | 1.2 | 8.1 | A | " |
| 4 | 3 | 2 | 81 | 76 | 96 | 1.2 | 8.1 | A | " |
| 5 | 3 | 3 | 82 | 82 | 97 | 1.2 | 8.0 | A | " |
| 6 | 1 | 5 | 80 | 81 | 93 | 1.3 | 8.1 | A | " |
| 7 | 3 | 4 | 68 | 62 | 92 | 3.6 | 12.3 | A | Comparison |
| 8 | 3 | 5 | 68 | 63 | 92 | 3.7 | 12.5 | A | " |
| 9 | 4 | 4 | 76 | 59 | 96 | 1.8 | 9.2 | A | " |
| 10 | 5 | 4 | 75 | 85 | 90 | 1.1 | 7.2 | C | " |

Note: 'Measured on the 3k image.

As is apparent from the results in Table 1, recorded images formed on recording medium 1 or 2 containing the benzotriazole compound of formula (I) (combination Nos. 1, 2 and 6) and the images formed with ink sets 1, 2 or 3 containing the benzotriazole compound of formula (I) (combination Nos. 3 to 5) are superior in light fastness, indoor preservability and ozone fastness to those formed on recording medium 3, 4 or 5 with ink set 4 or 5, neither of which contains the benzotriazole compound of formula (I) (combination Nos. 7 to 10). The image of combination No. 9, in which recording medium 4 contains a commonly employed benzotriazole UV absorber, is inferior to the images of the combinations according to the present invention in all these characteristics, clearly proving the effectiveness of the benzotriazole compound of formula (I). To make it worse, the ink receiving layer of recording medium 4 is tinged with yellow and practically useless.

It is also seen that the magenta images of combination Nos. 5 and 6, in which magenta dye (M-1) is used in the magenta ink composition, exhibit higher light fastness than the other magenta images.

The image of combination No. 10 formed on receding medium 5, which is of swell type, has poor ink absorptivity compared with those of other combinations.

The recording medium, the aqueous ink composition, and the ink jet recording method according to the present invention provide an image excellent in light fastness and gas fastness, particularity an image that can be preserved indoors for a long period of time with little color change and fading with time. The recording medium and the aqueous ink composition according to the present invention are suitable for use in ink jet recording. The recording medium of the invention, being of void type, is fit for high-quality image formation with an increased ink output.

While the present invention has been described in detail with reference to specific examples thereof, it will be apparent to one skilled in the art that various changes and modifications can be made therein without departing from the spirit and scope thereof.

What is claimed is:

1. A recording medium comprising a substrate having thereon an ink receiving layer comprising a porous pigment and a binder, wherein said ink receiving layer contains at least one benzotriazole compound represented by formula (I):

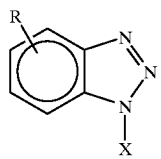

(I)

wherein R represents a hydrogen atom or an alkyl group; X represents a hydrogen atom, a sodium atom, a potassium atom or a primary, secondary or tertiary amino group.

2. The recording medium according to claim 1, wherein said benzotriazole compound comprises at least one of benzotriazole, benzotriazole sodium salt, 4-methylbenzotriazole, 4-methylbenzotriazole sodium salt, and a benzotriazole amine salt.

3. The recording medium according to claim 1, wherein said benzotriazole compound is present in a total amount of 0.01 to 5% by weight based on the weight of said ink receiving layer.

4. The recording medium according to claim 1, wherein said porous pigment is a silica pigment.

5. The recording medium according to claim 1, which is used for ink jet recording.

* * * * *